US011987414B2

(12) United States Patent
Lux et al.

(10) Patent No.: US 11,987,414 B2
(45) Date of Patent: May 21, 2024

(54) CAPSULE FILLING MACHINE FOR FILLING TWO-PIECE CAPSULES, AND METHOD FOR FILLING TWO-PIECE CAPSULES

(71) Applicant: Harro Hoefliger Verpackungsmaschinen GmbH, Allmersbach im Tal (DE)

(72) Inventors: Andreas Lux, Allmersbach im Tal (DE); Benedict Kleine-Koenig, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 18/068,317

(22) Filed: Dec. 19, 2022

(65) Prior Publication Data

US 2023/0192339 A1 Jun. 22, 2023

(30) Foreign Application Priority Data

Dec. 21, 2021 (EP) .................................... 21216624

(51) Int. Cl.

| | |
|---|---|
| ***B65B 43/00*** | (2006.01) |
| ***A61J 3/07*** | (2006.01) |
| ***B65B 1/04*** | (2006.01) |
| ***B65B 3/00*** | (2006.01) |
| ***B65B 3/04*** | (2006.01) |
| ***B65B 43/50*** | (2006.01) |
| ***B65B 57/14*** | (2006.01) |

(52) U.S. Cl.

CPC ............... *B65B 43/50* (2013.01); *A61J 3/074* (2013.01); *B65B 1/04* (2013.01); *B65B 3/003* (2013.01); *B65B 3/04* (2013.01); *B65B 57/145* (2013.01); *A61J 2200/70* (2013.01)

(58) Field of Classification Search

CPC ....................................................... A61J 3/074

See application file for complete search history.

(56) References Cited

U.S. PATENT DOCUMENTS

| | | | | |
|---|---|---|---|---|
| 5,750,938 A | 5/1998 | De Caris et al. | | |
| 7,343,724 B1 * | 3/2008 | Williams | A61J 3/074 53/287 | |
| 2006/0191240 A1 * | 8/2006 | Rothbauer | A61J 3/074 53/471 | |

(Continued)

FOREIGN PATENT DOCUMENTS

WO WO-2020230052 A1 * 11/2020 ............. A61J 3/074

*Primary Examiner* — Eyamindae C Jallow

(74) *Attorney, Agent, or Firm* — Walter Ottesen, P.A.

(57) ABSTRACT

The disclosure relates to a capsule filling machine for filling two-piece capsules that each include a capsule upper part and a capsule lower part. The capsule filling machine includes a measuring device, the measuring device including a capacitive measuring system. The measuring device is downstream of the closing station. The capacitive measuring system includes a measuring section, along which the mass of the filled, closed capsule can be measured via the capacitive measuring system. The measuring device includes a guide device for the closed capsule, the guide device being configured to convey the filled, closed capsule from the capsule segment to the measuring section of the capacitive measuring system.

11 Claims, 3 Drawing Sheets

(56) References Cited

U.S. PATENT DOCUMENTS

| | | | | |
|---|---|---|---|---|
| 2007/0028560 | A1* | 2/2007 | Gauthier | B65B 55/24<br>53/167 |
| 2008/0127609 | A1 | 6/2008 | Tagliavini et al. | |
| 2008/0256906 | A1 | 10/2008 | Gamberini | |
| 2010/0078093 | A1* | 4/2010 | Ansaloni | B65B 37/02<br>53/900 |
| 2010/0281824 | A1* | 11/2010 | Ansaloni | A61J 3/074<br>53/266.1 |
| 2011/0023414 | A1* | 2/2011 | Ansaloni | A61J 3/074<br>53/281 |
| 2012/0041778 | A1* | 2/2012 | Kraft | B65D 51/2828<br>215/250 |
| 2014/0311104 | A1 | 10/2014 | Gamberini et al. | |
| 2015/0342890 | A1* | 12/2015 | Penachio | A61P 11/06<br>141/71 |
| 2019/0029922 | A1 | 1/2019 | Tagliavini et al. | |

* cited by examiner

CAPSULE FILLING MACHINE FOR FILLING TWO-PIECE CAPSULES, AND METHOD FOR FILLING TWO-PIECE CAPSULES

CROSS-REFERENCE TO RELATED APPLICATIONS

This application claims priority of European patent application no. 21216624.3, filed Dec. 21, 2021, the entire content of which is incorporated herein by reference.

TECHNICAL FIELD

The disclosure relates to a capsule filling machine for filling two-piece capsules. The disclosure also relates to a method for filling two-piece capsules.

BACKGROUND

Primarily in the pharmaceutical field, but also in the field of food supplements, capsules are used to administer dosed quantities of a powdered, granulated or liquid preparation. The capsules are composed of hard gelatine or the like and dissolve after being swallowed, as a result of which their contents are released.

In the case of so-called two-piece capsules, indexed capsule filling machines first deliver empty capsules, which are positioned upright in capsule holders and then opened. The capsule lower parts are held in a segment lower part, the capsule upper parts in a segment upper part. After the capsules have been separated, the segment parts swivel apart, such that the capsule lower parts are free for filling. Then, in one or more dosing stations, the upwardly open capsule lower parts are filled with the intended preparation in a dosed quantity. In a closing station, the capsule upper parts are then fitted back onto the filled capsule lower parts. The filled capsules produced in this way are finally removed from their capsule holders in an ejection station and then sent for further processing, in particular for packaging.

In order to maintain the high quality standards, in particular in the pharmaceutical field, the fill quantity of the capsules is determined and checked for correctness. Such checks may be effected by random sampling. Often, so-called hundred-percent in-process checks are also provided, that is, the amount of fill product of each capsule is determined.

A method known for this purpose is the determination of the mass of the fill product by means of a capacitive measuring system. When the capsules are being filled, the fill product falls through a measuring channel of the capacitive measuring system, into the capsule lower part. Applied to the measuring channel there is an electrical measuring field, upon which the fill product acts, causing a change in the capacitance. On the basis of this capacitive change, the mass of the fill product can be determined during the filling process. This measuring method is characterized by its high measuring speed. Another advantage is that the mass of the fill product is measured directly, but not that of the capsule. Thus, the measurement described is a so-called net measurement. Consequently, the measurement result is not influenced by the capsule mass.

Via check measurements, however, it was possible to establish that the sensing of the fill quantity can only be determined with limited accuracy. For critical active ingredients, in particular, a greater accuracy may be wanted.

SUMMARY

It is an object of the disclosure to provide a capsule filling machine for filling capsules that enables the filled quantity of the fill product to be determined with a high degree of accuracy and, at the same time, at a high production speed.

This object is, for example, achieved by a capsule filling machine for filling two-piece capsules. The two-piece capsules each have a capsule upper part and a capsule lower part, the capsule filling machine including: at least one capsule segment having a plurality of receivers and being configured to convey the capsules, wherein the at least one capsule segment has a segment lower part configured to receive the capsule lower part and a segment upper part configured to receive the capsule upper part; an insertion station for delivering unfilled capsules into the plurality of receivers of the at least one capsule segment; a dosing station for filling the capsule lower part with a fill product; a closing station for closing the filled capsule lower part and the capsule upper part; a measuring device having a capacitive measuring system, the measuring device being downstream of the closing station, the capacitive measuring system having a measuring section, along which a mass of the filled, closed capsule can be measured via the capacitive measuring system; the capacitive measuring system including a capacitive sensor arranged at the measuring section; the measuring device including a guide for the closed capsule; the guide being configured to convey the filled, closed capsule from the capsule segment to the measuring section of the capacitive measuring system; and, a plurality of processing tracks, wherein the capacitive measuring system includes a separate one of the measuring sections for each of the plurality of processing tracks.

It is a further object of the disclosure to disclose a method for filling capsules that enables the filled quantity of the fill product to be determined with a high degree of accuracy and, at the same time, at a high production speed.

This object is, for example, achieved by a method for filling two-piece capsules, each of the two-piece capsules having a capsule upper part and a capsule lower part, via a capsule filling machine, the capsule filling machine having a plurality of processing tracks, a capacitive measuring system including a separate measuring section for each of the plurality of processing tracks, and the capacitive measuring system having a capacitive sensor arranged at the measuring section. The method includes: delivering, at an insertion station of the capsule filling machine, an unfilled capsule to a capsule receiver of at least one capsule segment; separating the capsule upper part and the capsule lower part from each other; filling the capsule lower part with fill product in a dosing station; closing the filled capsule lower part and the capsule upper part in a closing station; conveying the filled capsule via a guide to a measuring section of the capacitive measuring system; and, measuring a mass of the filled capsule in the measuring section via the capacitive measuring system.

The disclosure is based on the knowledge that the measured fill product that falls through the measuring channel into the capsule lower part does not necessarily have to be completely present in the closed capsule. The difference from the measured fill product and the fill product actually contained in the capsule may be attributed, for example, to the filling or the closing of the capsules. It has been found that, for example, very small quantities of fill product can also fall next to the capsule lower part after exiting the measuring channel. Quantities of fill product can also be spilled when the filled capsule lower part is guided into the capsule upper part in order to close them together. To avoid the disadvantages described above, the measurement of the fill product should only be effected after the capsule has been closed.

A capsule filling machine according to the disclosure is used for filling two-piece capsules that each have a capsule upper part and a capsule lower part. The capsule filling machine includes an insertion station for delivering unfilled capsules into the capsule receiver of at least one capsule segment. The capsule segment is configured to convey the capsules. The capsule segment comprises a segment lower part for receiving the capsule lower part, and a segment upper part for receiving the capsule upper part. The capsule filling machine includes a dosing station for filling a capsule lower part with fill product, and a closing station for closing the filled capsule lower part and the capsule upper part. In addition, the capsule filling machine comprises a measuring device, the measuring device comprising a capacitive measuring system. The measuring device is downstream of the closing station. The capacitive measuring system comprises a measuring section. Along the measuring section, the mass of the filled, closed capsule can be measured by means of the capacitive measuring system. The measuring device includes a guide/guide device for the closed capsule. The guide device is configured to convey the filled, closed capsule from the capsule segment to the measuring section of the capacitive measuring system.

Accordingly, for the purpose of filling two-piece capsules, an unfilled capsule is delivered to a capsule receiver of at least one capsule segment. The delivering of the unfilled capsule is effected at an insertion station of the capsule filling machine. The capsule upper part and the capsule lower part are then separated from each other. The capsule lower part and the capsule upper part are closed in a closing station. The filled capsule is conveyed by means of a guide device to a measuring section of a capacitive measuring system. There, the mass of the filled capsule is measured by means of the capacitive measuring system.

The capsules are usually delivered to the capsule filling machine in a pre-closed state. In the so-called pre-closure, the capsule lower part is only slightly inserted into the capsule upper part, such that the capsule halves can be easily separated from each other in the separation station. Once the capsule lower part is filled, the capsule halves are usually completely closed via a lock. In the sense of the invention, a capsule is already closed when the capsule lower part and the capsule upper part overlap, with the result that the fill product can no longer escape from the capsule. Accordingly, a closed state of the capsule is understood to be both a pre-closed and a finally closed state of the capsule.

This configuration of the capsule filling machine measures the mass of the capsule when having been filled with fill product and closed. Accordingly, the gross mass of the capsule is measured. To determine the net mass of the capsule, that is, the mass of the fill product, the tare mass of the capsule must be subtracted from the gross mass of the capsule. The tare mass of the capsule is usually specified by the capsule manufacturer. As the measurement of the total mass is only effected after the capsule has been closed, differences in the mass of the measured fill product and the fill product in the closed capsule can be excluded. It is thus possible to achieve a high degree of accuracy in determining the mass of the fill product in the capsule.

Preferably, a further capacitive measuring system is provided, for measuring the mass of unfilled capsules. The mass of the unfilled capsule can be measured via the further capacitive measuring system. Accordingly, the further capacitive measuring system must be located at least upstream of the dosing station. Advantageously, the mass of the unfilled capsule is measured before the capsule upper part and capsule lower part are separated. In an embodiment, the further capacitive measuring system is upstream of the insertion station. Accordingly, the mass of the unfilled capsule is measured by means of the further capacitive measuring system even before the capsule is inserted the first time into the capsule segment. Preferably, the mass of the fill product is determined, by means of a control system of the capsule filling machine, from the difference of the measured mass of the filled capsule and the measured mass of the unfilled capsule. This is a so-called gross-tare measurement. Both the gross mass and the tare mass of the capsule are measured. The net mass is determined from the difference of the gross mass and the tare mass. The actual tare mass of the capsule may differ from the manufacturer's specifications. Such differences result in unwanted inaccuracies in the determination of the net mass of a capsule, in particular in the filling of very small quantities of critical pharmaceutical substances. By measuring the unfilled capsule, the mass of the empty capsule is determined precisely, in particular independently of the manufacturer's specifications. Via this gross-tare measurement, the net mass of the capsule can be determined with precision.

It can advantageously be provided that the capsule filling machine has a plurality of processing tracks, the capacitive measuring system comprising a separate measuring section for each processing track. This allows the mass of the capsules to be measured in a lane-based manner. The lane-based measurement allows conclusions to be drawn about the previous processing of the capsule on the corresponding processing track. If it is determined that the mass of the fill product differs from the target mass on a processing track, the individual stations can be checked for correctness along this processing track without the need to check all stations of other processing tracks. Causes of errors in the process chain can be identified much more quickly.

The guide device can have a lifting unit, the lifting unit being configured to lift the filled capsule out of the capsule segment and to position the filled capsule in the measuring section of the capacitive measuring system. Due to this configuration of the guide device, the measuring device forms a module that in principle can be positioned flexibly in the capsule filling machine. Thus, the guide device may be arranged, for example, at one of the processing stations following the closing station. Preferably, the measuring equipment is arranged between the closing station and the ejection station. The lifting unit conveys the capsule into the measuring section, the capsule preferably being held in the measuring section. The measurement of the capsule is preferably effected statically, that is, the capsule does not move, or at least hardly moves, during the measurement by means of the capacitive measuring system. Very good measurement results with high measurement accuracy can be achieved by use of the static measurement.

In an alternative embodiment of the guide device, the guide device has a guideway, the guideway leading into the measuring section of the capacitive measuring system. The measurement of the mass of the filled capsule is effected while the capsule slides along the guideway, through the measuring section. Accordingly, the measurement is effected dynamically. Changes in the speed and the position of the capsule during measurement have a considerable effect on the accuracy of the measurement. Accordingly, the difficulty of dynamic measurements is to set a speed of the capsule, as well as a distance between the capsule and the capacitive sensor, that are as constant as possible. For this purpose, the measuring section is preferably inclined with respect to the direction of gravity. The capsule, acted upon by gravity, lies on the measuring section and slides down it. Due to the inclined position of the measuring section, the capsule is guided on the measuring section and thus is at an almost constant distance from the capacitive sensor of the measuring system. The speed of the capsule during measurement can also be kept almost constant due to the inclined position of the measuring section. Thus, a high measuring accuracy and, at the same time, a high capsule output in the measurement of the capsule mass can be achieved. Such a measuring device is preferably arranged downstream of the ejection station.

BRIEF DESCRIPTION OF DRAWINGS

The invention will now be described with reference to the drawings wherein.

DETAILED DESCRIPTION OF THE INVENTION

Figure 1:
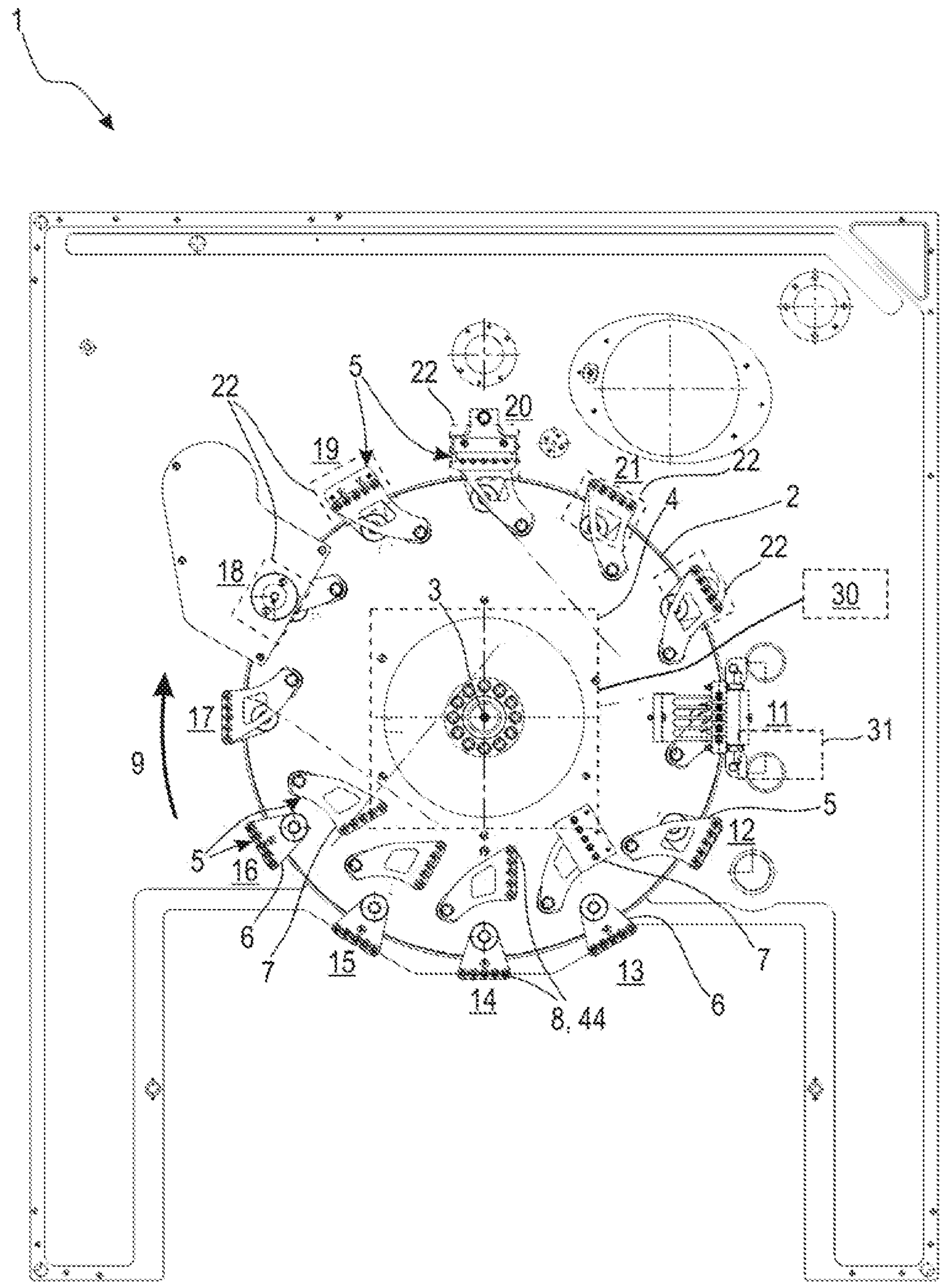
FIG. 1 shows a plan view of a capsule filling machine in a configuration according to the disclosure including a measuring device.
Figure 2:
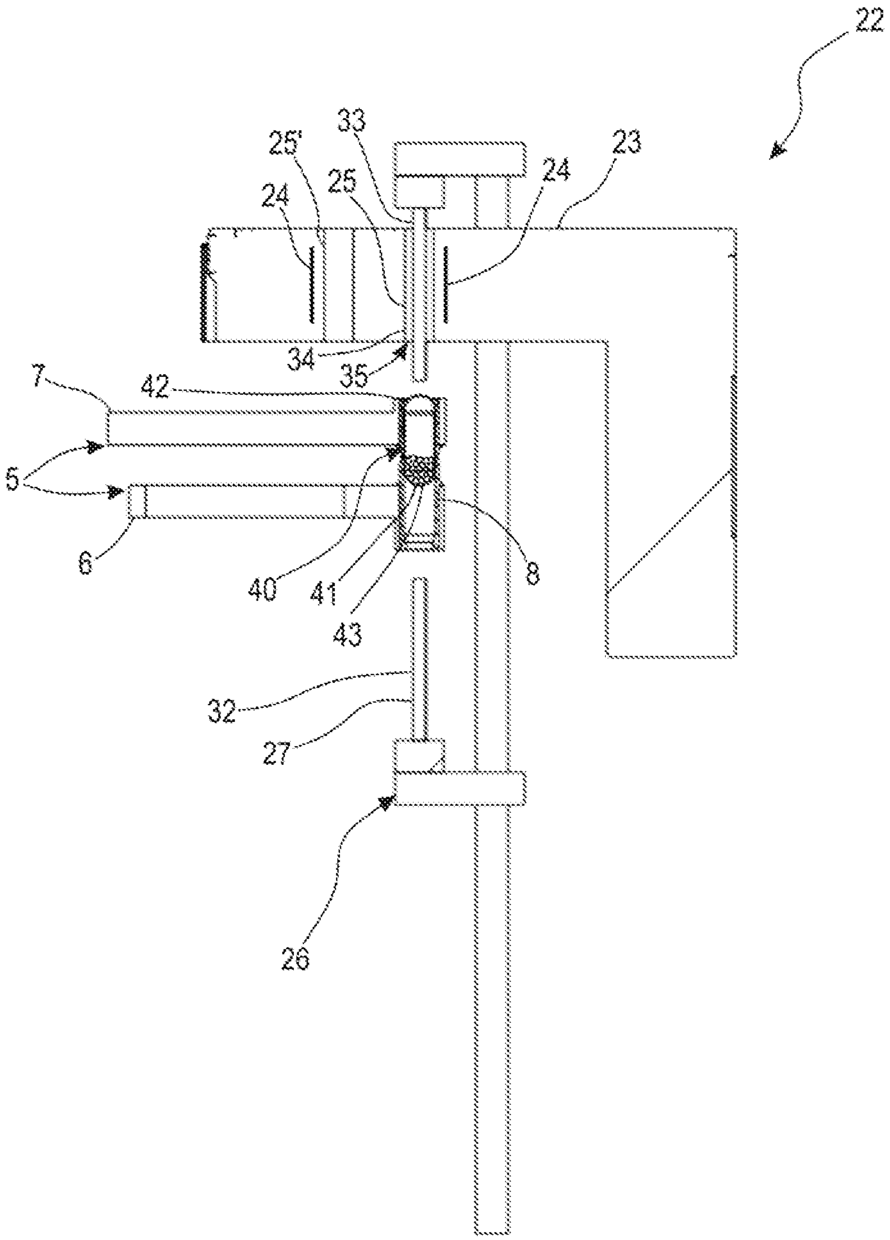
FIG. 2 shows a schematic lateral representation of the measuring device, the guide device and a capsule segment; and, FIG. 3 shows a schematic lateral representation of an alternative embodiment of the guide device.
Figure 3:
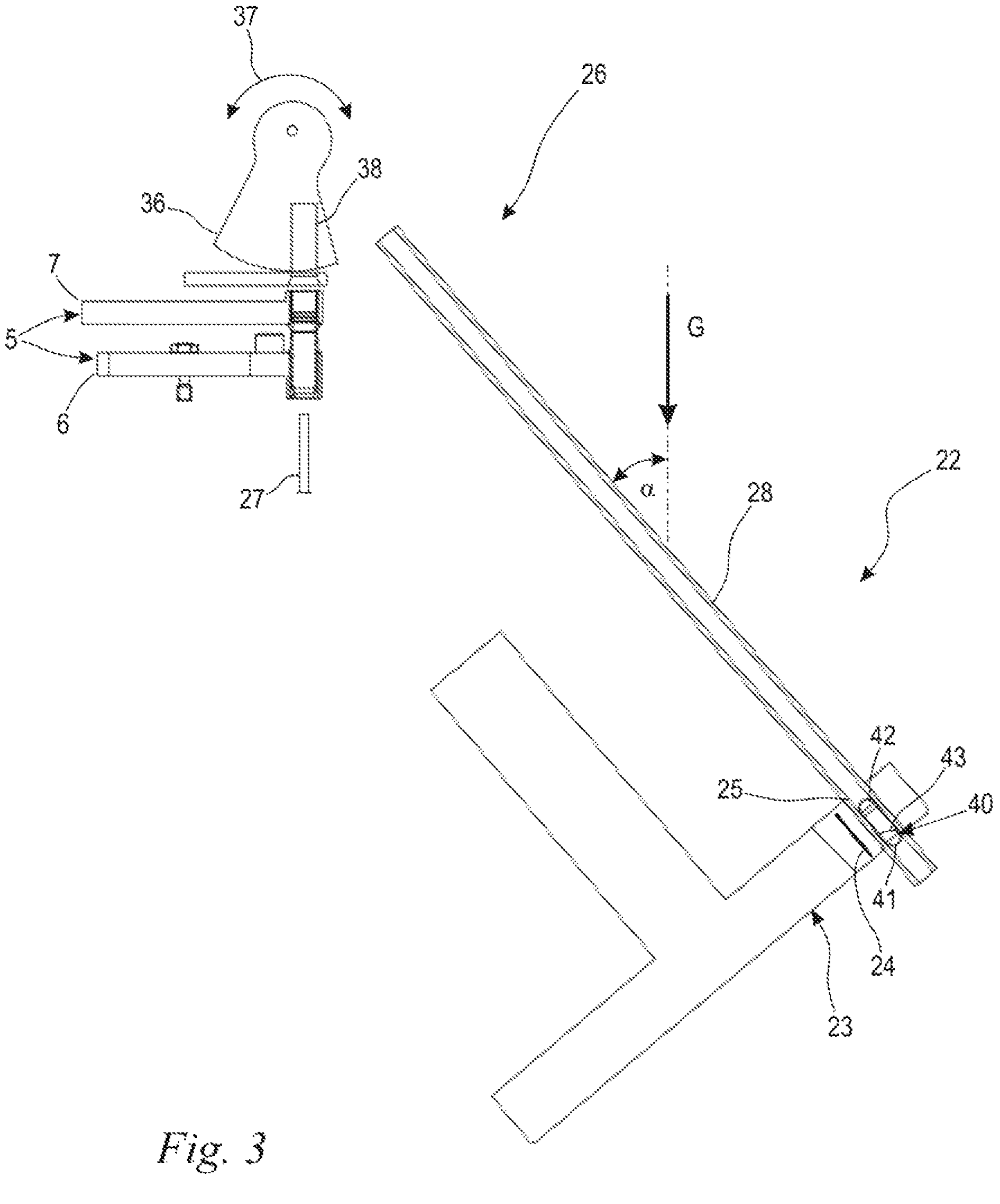

FIG. 1 shows a plan view of an embodiment of a capsule filling machine 1 according to the invention for filling capsules 40 with a fill product 43 (see also FIGS. 2 and 3). The fill product 43 may be provided in the form of a powder, a granulate, tablets, liquids or the like. It may be a pharmaceutical preparation, a food supplement or the like. The capsules 40 are composed of a capsule lower part 41 and, attached thereto, a capsule upper part 42, both of which are made, for example, of hard gelatine.

The capsule filling machine 1 according to FIG. 1 comprises a rotary table 2 and a schematically represented main drive unit 4, with the rotary table 2 being drivable, by means of the main drive unit 4, to rotate about a vertical axis of rotation 3, in accordance with the direction of rotation 9, in indexed steps. The main drive unit 4 comprises at least one electric motor, which is operatively connected to the rotary table 2 and drives it. Preferably, the capsule filling machine 1 comprises a control system 30, which is coupled to the main drive unit. The control system 30 is also only represented schematically in dashed lines in FIG. 1. A number of capsule segments 5 are arranged at uniform angular intervals on a circumferential region of the rotary table 2. In the embodiment shown, a total of twelve capsule segments 5 are provided. A different number of capsule segments 5 may also be expedient. Each capsule segment 5 is composed of a segment lower part 6, which is preferably fixedly fastened to the circumferential region of the rotary table 2, and a segment upper part 7 that can be swiveled relative thereto. A plurality of fixed processing stations 11 to 21, which do not rotate with the rotary table 2, are positioned around the rotary table 2, and are not represented in detail in FIG. 1. The number of processing stations 11 to 21 preferably corresponds to the number of capsule segments 5, such that in each rotary position of the rotary table 2 indexed in angular increments, each capsule segment 5 comes to rest in the access region of respectively one of the processing stations 11 to 21.

In the preferred embodiment, the capsule segments 5 contain a plurality of capsule receivers 8 for receiving the capsules. In the preferred embodiment, each capsule segment 5 contains five capsule receivers 8. It may be expedient to also provide a plurality of capsule receivers 8, in particular ten, preferably twelve capsule receivers 8. In the preferred embodiment, the capsule receivers 5 are arranged in a linear, rectilinear row. If there is a large number of capsule receivers 5, they may also be arranged in two or more such rows.

The preferred embodiment of the capsule filling machine 1 comprises an insertion station 11, in which initially provisionally assembled empty capsules, composed of a capsule lower part 41 and a capsule upper part 42, are inserted. In normal operation, the attached capsule upper part 42 is separated from the capsule lower part 41. The next processing station is a reject station 12. Defective, unseparated empty capsules are rejected in the reject station 12. The next processing station is a discard station 12. Defective, unseparated empty capsules are discarded in the discard station 12.

After the discard station 12, the segment upper part 7 with the capsule upper parts 42 held therein is swiveled relative to the segment lower part 6 with the capsule lower parts 41 held therein. The segment lower part 6 is guided to the dosing stations 13, 14, 15, three in total in this case, that follow the discard station 12. In the dosing stations 13, 14, 15 the capsule lower parts held in the segment lower parts 6 are filled with the intended fill product 43. It may also be sufficient to provide only one or two dosing stations.

Following the passage through the last dosing station 15, the segment upper part 7 is swiveled, via the stations 16, 17, 18, back into the aligned position relative to the segment lower part 6. In the closing station 18, the capsules 40 are preferably closed in that the previously removed, or separated, capsule upper parts 42 are pushed back onto the filled capsule lower parts 41. Preferably, the capsule halves 41, 42 are locked together. The closing station 18 is followed by a plurality of checking stations 19, 20. In the checking stations 19, 20, capsules 40 are checked and if necessary rejected. In a subsequent ejection station 21, the remaining capsules 8 that are found to be good are ejected by means of pushers, or other ejection means not represented. The capsules 8 may also still be checked in the ejection station 21.

As shown in FIG. 1, the capsule filling machine 1 comprises a measuring device 22. The measuring device 22 is only represented schematically in dashed lines in the form of a square. The measuring device 22 serves to measure the mass of a capsule 40. The measuring device 22 is located downstream of the closing station 18. As indicated in FIG. 1, the measuring device 22 may be arranged, in terms of the process, between the closing station 18 and up to beyond the ejection station 21. Accordingly, only closed capsules 40 are measured in the measuring device 22. Of course, it may also be expedient to provide a plurality of measuring devices 22 in a capsule filling machine 1. It is to be noted at this point that the terms "upstream" and "downstream" are to be understood in terms of the process in relation to the processing of the capsules 40. Thus, if a first device is upstream of the second device, the capsules 40 in the capsule filling machine 1 first pass through the first device and then through the second device.

As shown in FIGS. 2 and 3, the measuring device 22 comprises a capacitive measuring system 23 and a guide/ guide device 26. The capacitive measuring system 23 comprises at least one measuring section 25. Further, the capacitive measuring system 23 comprises a capacitive sensor 24 arranged at the measuring section 25. The capacitive sensor 24 generates an electric field that extends at least partially over the measuring section 25. When a capsule 40 is guided into the measuring section 25, it causes a change in the electric field, as a result of which the mass of the capsule 40 is calculated. As shown in FIG. 2, in a particularly preferred embodiment of the capsule filling machine 1, the capacitive measuring system 23 comprises a reference measuring section 25' to determine the dielectricity of the environment. Thus, an even more accurate determination of the mass of the capsule 40 can be effected in the measuring section.

The guide device 26 of the measuring device 22 is configured to convey the capsule 40 from the capsule segment 5 to the measuring section 25 of the capacitive measuring system 23. FIG. 2 shows an embodiment of the measuring device 22, in which the guide device 26 comprises a lifting unit 27. The lifting unit 27 comprises a lower slider 32 assigned to the segment lower part 6, and an upper slider 33 assigned to the segment upper part 7. After the capsule upper part 42 and capsule lower part 41 have been closed, the entire filled capsule 40 is lifted out of the capsule segment 5 by the lower slider 32 and into the measuring section 25 of the capacitive measuring system 23. The measuring section 25 is realized as a measuring channel 34, the measuring channel 34 having a channel opening 35 at its end that faces towards the capsule segment 5. The capsule 40 can be pushed into the measuring channel 34 via the channel opening 35. Where the capsule 40 is transferred by the lifting unit 27, the measuring channel 34 and the capsule receiver 8 are approximately coaxial with each other. In a preferred execution, the lifting unit 27 may also be part of the closing station 18.

Once the capsule 40 is positioned in the measuring section 25, it is preferably fixed by the lower slider 32 and/or the upper slider 33. The mass of the closed and filled capsule 40 is measured in the measuring channel 34 by means of the capacitive measuring system 23. Following completion of the measuring process, the capsule 40 is placed back into the capsule receiver 8 of the capsule segment 5 by means of the lifting unit 27. Since not only the fill product 43 is measured when it is filled into the capsule 40, but the entire capsule 40 with fill product 43 in a closed state, the capacitive measuring process is non-dependent on the fill product 43 to be filled. Accordingly, liquid fill product or the like can also be measured. The capsule 40 can then pass through the further processing stations.

In an alternative configuration of the capsule filling machine 1, the lifting unit 27 may also have other means, instead of the sliders 32, 33, for lifting the capsule 40 out of the capsule segment 5 and/or for holding the capsule 40 in the measuring section 25. Such means may also be, for example, compressed air, vacuum or other mechanical elements.

An alternative configuration of the measuring equipment 22 is shown in FIG. 3. The guide device 26 likewise comprises a lifting unit 27. The lifting unit preferably comprises a pusher for lifting the capsule 40 on the capsule segment 5. It may also be expedient to provide another means for lifting the capsule 40. Further, the guide device 26 comprises a swivel arm having a capsule holder 38. In addition, the guide device 26 comprises a guideway 28, a portion of the guideway 28 preferably being realized as a measuring section 25. The capsule 40 is lifted out of the capsule segment 5 by means of the lifting unit 27 and pushed into the capsule holder 38 of the swivel arm 36. When the capsule 40 is in the capsule holder 38, it is held in the capsule holder 38 by holding means, not represented in more detail. Such a holding means could be, for example, a vacuum applied to the capsule holder 38. The swivel arm 36 then swivels, in a swivel direction 37, towards the guideway 28. When the capsule holder 38 is aligned approximately coaxially with the guideway 28, the capsule 40 is released and slides onto the guideway 28 due to gravity. In the present case, the guideway 28 is realized as a guide channel. It may also be expedient, however, for the guideway 28 to be of an open configuration, for example in the form of a trough. The capsule 40 slides down the guideway 28 and passes through the measuring section 25. The capacitive sensor 24 of the capacitive measuring system 23, which generates the electric field, is arranged at the measuring section 25. The capsule 40 passes through the electric field of the capacitive measuring system 23. The mass of the filled capsule 40 is measured. Measuring is effected as the capsule 40 slides through the measuring section 25, hence the measurement is dynamic.

As shown in FIG. 3, the guideway 28 is inclined with respect to the direction of gravity G. With the direction of gravity G, the guideway 28, in particular its longitudinal axis, encloses an angle $\alpha$, the angle $\alpha$ being in a range of from 5° to 50°, in particular from 25° to 45°. The angle $\alpha$ is preferably about 40°. Compared to a drop shaft, this results in two substantial advantages that provide increased measuring accuracy. Firstly, the speed at which the capsule 40 passes through the measuring section 25 is reduced, and is approximately constant. Secondly, the capsule 40 is in permanent contact with the guideway 28 and thus has a fixed path of movement. Thus, the capsule 40 passes through the measuring section 25 approximately always at the same speed and the same position. As already mentioned at the beginning, this increases the measuring accuracy. The embodiment of the measuring device 22 with a guide device 26 according to FIG. 3 is preferably provided after the ejection station 21. Thus, the guide device 26 may even be part of the ejection station 21.

The capsule filling machine 1 comprises a plurality of processing tracks 44 along which a plurality of capsules 40 can be filled. As already explained above, in the present embodiment of the capsule filling machine 1 according to FIG. 1, five capsule receivers 8, and thus also five processing paths 44, are provided. For each processing lane 44, a measuring section 25 of the capacitive measuring system 23 is preferably provided, such that a lane-based measurement of the mass of the capsules 40 can also be effected. If it is determined that the mass of the fill product 43 differs from the target mass on a processing track 44, the individual stations can be checked for correctness along this processing track 44 without the need to check all stations of other processing tracks 44. In the case of the measuring device 22 according to FIG. 3, it may also be expedient, provided it is arranged after the ejection station 21 or is at least part of the ejection station 21, to provide only one measuring section 25. The capsules 40 are preferably guided sequentially onto the guideway 28, with the sequence of the capsules 40 of the various processing paths 44 being sensed by the control system 30. The measurement values of the capacitive measuring system 23 can thus be assigned to each capsule 40 of the corresponding processing path 44.

To determine the net mass of the filled capsule 40, that is, the mass of the fill product 43, the tare mass of the capsule 40 must be subtracted from the measured gross mass of the capsule 40. The tare mass of the capsules 40 is known and stored in the control system 30. However, the known tare mass of the empty capsules is merely a statistical mean value, which is either itself determined over a particular number of capsules 40 or is specified by the manufacturer of the empty capsules. Accordingly, there may be differences between the real mass of an empty capsule and the statistical mean value of the mass of the empty capsule. These differences can have a considerable effect on the total mass of a filled capsule 40, in particular in the filling of very small quantities of fill product 43. In a particularly preferred embodiment, therefore, the capsule filling machine 1 comprises a further capacitive measuring system 31, which serves to measure the mass of the empty capsules 40. The further capacitive measuring system 31 is an integral component of the capsule filling machine 1. The further capacitive measuring system 31 is preferably arranged before the insertion station 11 of the capsule filling machine 1, as schematically indicated by a dashed rectangle in FIG. 1. Alternatively, the further capacitive measuring system 31 may also be part of the insertion station 11. Technically, the further capacitive measuring system 31 is similar in structure to the capacitive measuring system 23. Even before the empty capsule 40 is separated into a capsule lower part 41 and a capsule upper part 42, it is guided into the measuring section, where its mass is measured. The measurement result is stored in the control system 30. After the same capsule 40 has been filled and its gross mass measured, the net mass is determined by the control system 30. For this purpose, the previously measured tare mass of the capsule 40 is subtracted from the gross mass. The measurement result is therefore extremely accurate, enabling the masses of even very small quantities of fill product to be determined with very high precision.

It is understood that the foregoing description is that of the preferred embodiments of the invention and that various changes and modifications may be made thereto without departing from the spirit and scope of the invention as defined in the appended claims.

The invention claimed is:

1. A capsule filling machine for filling two-piece capsules, the two-piece capsules each having a capsule upper part and a capsule lower part, the capsule filling machine comprising:

at least one capsule holder having a plurality of receivers and being configured to convey the capsules, wherein said at least one capsule holder has a holder lower part configured to receive the capsule lower part and a holder upper part configured to receive the capsule upper part;

an insertion station for delivering unfilled capsules into said plurality of receivers of said at least one capsule segment;

a dosing station for filling the capsule lower part with a fill product;

a closing station for closing the filled capsule lower part and the capsule upper part;

a measuring device having a capacitive measuring system, said measuring device being downstream of said closing station, said capacitive measuring system having a measuring section, along which a mass of the filled, closed capsule can be measured via said capacitive measuring system;

said capacitive measuring system including a capacitive sensor arranged at said measuring section;

said measuring device including a guide for the closed capsule;

said guide being configured to convey the filled, closed capsule from said capsule holder to said measuring section of said capacitive measuring system; and, a plurality of processing tracks, wherein said capacitive measuring system includes a separate one of said measuring sections for each of said plurality of processing tracks.

2. The capsule filling machine of claim 1 further comprising a further capacitive measuring system configured to measure a mass of unfilled capsules.

3. The capsule filling machine of claim 2, wherein said further capacitive measuring system is upstream of said insertion station.

4. The capsule filling machine of claim 1, wherein said guide has a lifting unit configured to lift the filled capsule out of said capsule holder and to position the filled capsule in said measuring section of said capacitive measuring system.

5. The capsule filling machine of claim 4, wherein said measuring device is arranged between said closing station and an ejection station.

6. The capsule filling machine of claim 1, wherein said guide has a guideway leading into said measuring section of said capacitive measuring system.

7. The capsule filling machine of claim 6, wherein said measuring section is inclined with respect to a direction of gravity (G).

8. The capsule filling machine of claim 6, wherein said measuring device is arranged downstream of an ejection station.

9. A method for filling two-piece capsules, each of the two-piece capsules having a capsule upper part and a capsule lower part, via a capsule filling machine, the capsule filling machine having a plurality of processing tracks, a capacitive measuring system including a separate measuring section for each of the plurality of processing tracks, and the capacitive measuring system having a capacitive sensor arranged at the measuring section, the method comprising:

delivering, at an insertion station of the capsule filling machine, an unfilled capsule to a capsule receiver of at least one capsule segment;

separating the capsule upper part and the capsule lower part from each other;

filling the capsule lower part with fill product in a dosing station;

closing the filled capsule lower part and the capsule upper part in a closing station;

conveying the filled capsule via a guide to a measuring section of the capacitive measuring system; and, measuring a mass of the filled capsule in the measuring section via the capacitive measuring system.

10. The method of claim 9, wherein a mass of the unfilled capsule is measured via a further capacitive measuring system.

11. The method of claim 10 further comprising determining a mass of the fill product from a difference of the measured mass of the filled capsule and a measured mass of the unfilled capsule via a control system of the capsule filling machine.

* * * * *